United States Patent Office 2,881,424
Patented Apr. 7, 1959

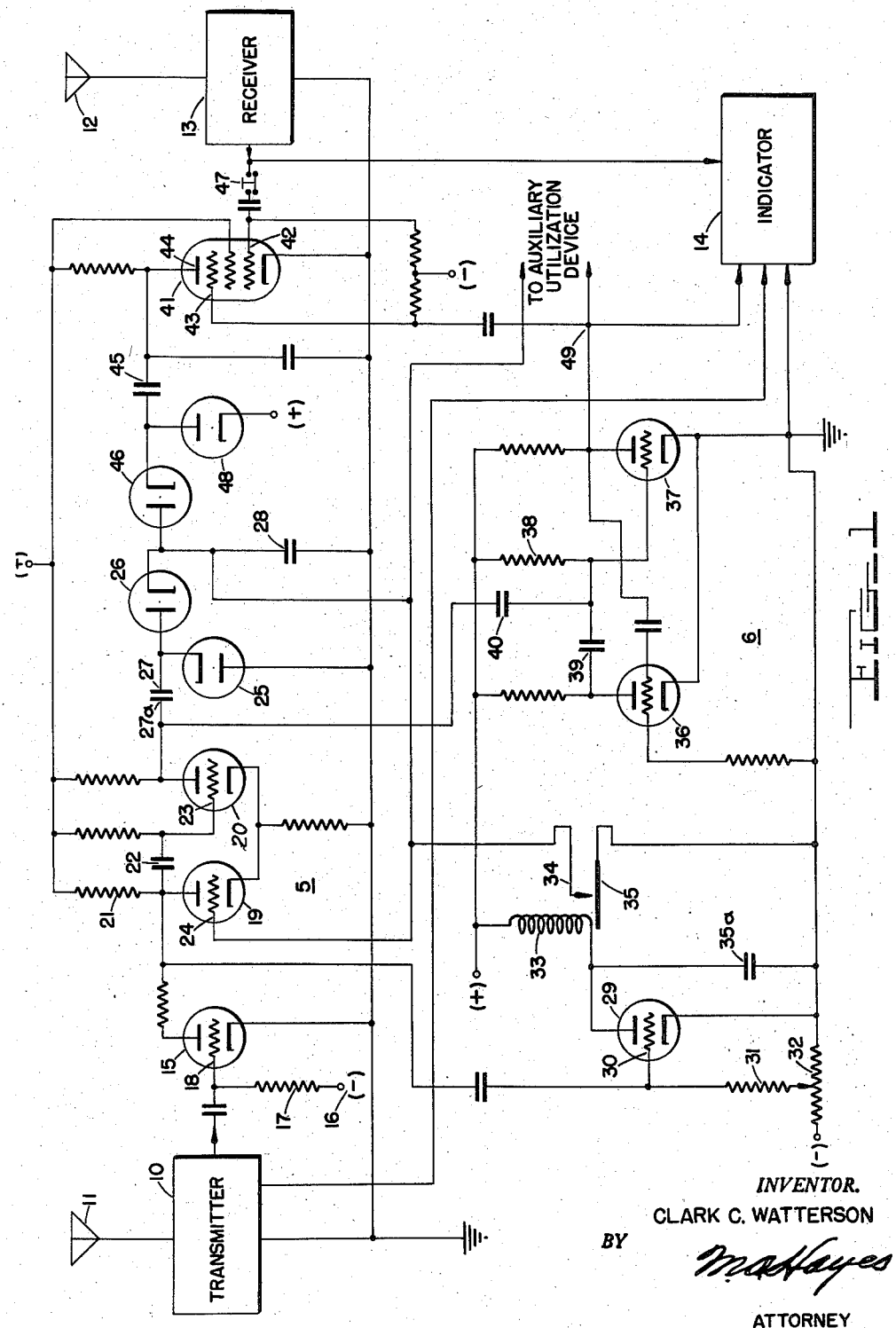

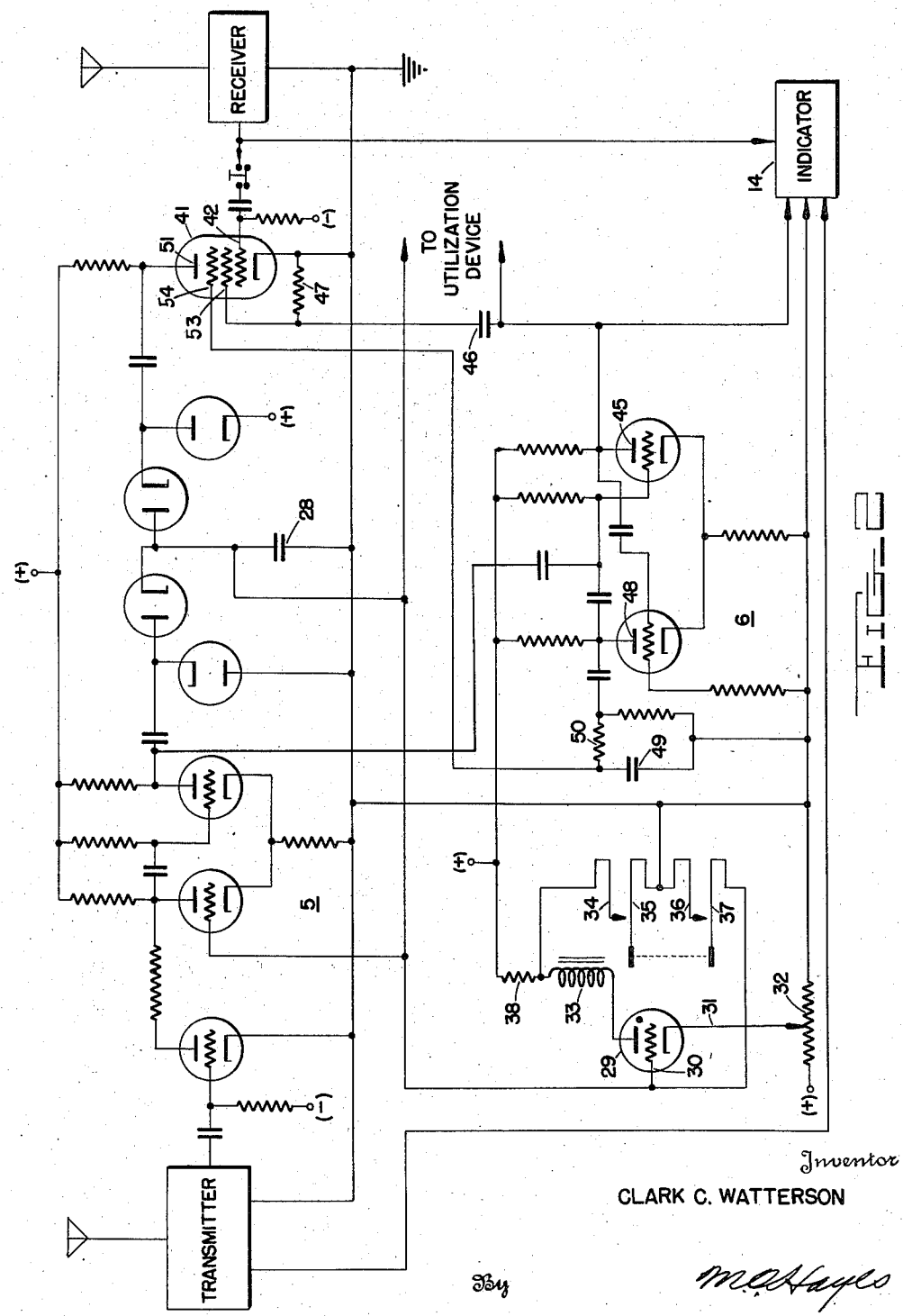

2,881,424

SIGNAL GENERATING APPARATUS

Clark C. Watterson, Washington, D.C.

Application May 17, 1946, Serial No. 670,403

5 Claims. (Cl. 343—7.3)

(Granted under Title 35, U. S. Code (1952), sec. 266)

This invention relates to electrical signaling systems and in particular to pulse ranging systems capable of producing control signals in coincidence with the reception of signals returned by selected objects.

In numerous applications of pulse ranging systems, such as echo signaling systems it is desirable to incorporate within the system apparatus or equipment for producing a control signal in coincidence with the arrival of selected pulse signals from distant sources. Such a control signal is required for the automatic operation of auxiliary equipment, such as mechanical range indicators, from the pulse system.

Accordingly, it is an object of the present invention to provide in a pulse echo signaling system a generator device for producing a control signal in definite time relation to the reception of echo energy from a selected energy return object.

Another object of the present invention is to provide in a radio signaling system a generator for producing a control signal in selected time relationship to the reception of returned signal energy from a selected energy return object despite variations in the position of the object.

Other and further objects and features of the present invention will become apparent upon a careful consideration of the accompanying description and drawing.

Fig. 1 is a schematic diagram partly in block, of a typical embodiment of the present invention.

Fig. 2 is a variant embodiment of the features of the present invention.

In accordance with the general concepts of the present invention, apparatus is provided for a pulse echo signaling system which will produce a control signal in dependency on the time of arrival of incoming energy signals. To produce this control signal, a first pulse signal generator is provided to be set into operation by the pulse energy source of the signaling system. Succeeding pulses produced by this first generator may be of progressively varying time duration so that the trailing edges thereof will occur over the time delay range in which echo signals are to be received. A second pulse signal generator is provided to produce a fixed duration signal responsive to the trailing edge of the signal from the first pulse generator. Coincidence apparatus is provided for stopping the variation in the time duration of the pulse from the first generator upon receipt of echo pulse energy by return from a distant object and for varying the time duration thereof as the distance to the distant object changes.

With reference to Fig. 1 a typical control signal generator system is shown as incorporated in a pulse echo signaling system of the "radar" type having a pulse signal transmitter 10, radiation means 11, 12, a pulse signal receiver 13 and an elapsed time indicator 14.

In a typical radar system the elapsed time indicator 14 would include a cathode ray tube provided with a recurrent time varying sweep signal initiated by the generation of a pulse of energy by the transmitter 10. Thus echo energy intercepted by antenna 12 after reflection or reradiation from a distant object is received at a period in time subsequent to the start of the triggered sweep signal and is presented on the cathode ray tube of indicator 14 as a signal displaced in time from the start of the sweep, and consequently the occurrence of the transmitter pulse.

In situations wherein a control signal is desired for the operation of auxiliary (e.g. mechanical) equipment in dependency on the time delay between pulse energy transmission and return of echo energy, the simple radar components so far described must be supplemented by additional components. The additional components employed must also provide for the selection of a certain echo signal out of a plurality of echo signals that might be intercepted by antenna 12.

Positive timing signals produced in coincidence with the generation of pulse energy signals by the transmitter 10 are applied to a switch stage including electron tube 15. Tube 15 is biased to a normally non-conductive condition by a negative potential 16 applied through resistance 17 to the grid 18.

Operatively connected to the tube 15 is a trigger circuit 5 having tubes 19, 20 connected as a one-shot multivibrator in which tube 20 is normally conductive. Conduction by tube 15 in response to a positive pulse from transmitter 10 results in the production of a negative pulse across resistance 21 which is subsequently applied through capacitance 22 to the grid 23 of tube 20. Responsive to this signal, the conductive condition of the trigger circuit 5 is reversed so that tube 19 is placed in a conductive state to remain in that condition until the discharge of capacitance 22 permits tube 20 to return to conduction. As will be seen later, the duration of the non-conductive period of tube 20 may be further controlled by the value of the biasing voltage applied to the grid 24 of tube 19.

Trigger action of the multivibrator circuit therefore produces a positive pulse signal at the anode of tube 20. This positive pulse signal is applied to a bias adjusting circuit similar to conventional condenser count down or frequency division circuits, comprising diode electron tubes 25, 26, a capacitive element having plates 27, 27a, and capacitance 28. In an initial condition wherein capacitance 28 is not charged, a positive pulse from the anode of tube 20 will cause conduction through the series path of the capacitive element having plates 27, 27a, electron tube 26 and capacitance 28, resulting in a charging of the two capacitances so that the resulting voltage developed across each is inversely dependent on the ratio of their capacitive values. At the conclusion of the positive pulse, when tube 20 resumes conduction, plate 27 is clamped at "ground" potential by conduction of diode electron tube 25. Subsequent positive pulses will produce further charging of capacitance 28 so that the potential at the grid 24 of tube 19 is caused to rise in a stepwise manner, increasing the variation in the anode voltage of the tube 19 as that tube changes between the conducting and the non-conducting conditions in the operation of the trigger circuit 5. This increase in the amplitude of the anode excursions causes an increase in the duration of the cutoff period of tube 20 so that the time spacing between the transmitter pulse and the trailing edge of the positive pulse produced at the anode of tube 20 increases.

The voltage excursions of the anode of tube 19 are applied to a biased switch tube 29 which is held in a normally non-conductive state by the connection of the grid 30 thereof to a negative supply through resistance 31 and potentiometer 32. When the voltage excursions of the anode of tube 19 reach a selected maximum amplitude producing a maximum time spacing between the generation of a pulse by the transmitter 10 and the trailing edge of the positive pulse at the anode of tube 20, potentiometer 32 is adjusted so that tube 29 is just brought to conduction.

Conduction by tube 29 produces current flow through the coil 33 of a relay having normally open contacts 34 and 35 connected across capacitance 28. By the operation of this relay capacitance 28 is shorted out to restore, for subsequent operation, the initial condition of short time displacement between the transmitted pulse and the trailing edge of the positive pulse from the anode of tube 20. Capacitance 35–a is placed in shunt with the anode circuit of tube 29 producing an increase in average current flow through coil 33.

Also responsive to the operation of the trigger circuit 5 is a second trigger circuit 6 having electron tubes 36, 37 connected in the form of a multivibrator in which tube 37 is normally conductive. The positive-going or leading edge of the positive pulse from the anode of tube 20 has relatively little effect upon the operation of trigger circuit 6, serving primarily to drive tube 37 to somewhat increased conduction. On the other hand, the negative going or trailing edge of the pulse from the anode of tube 20 interrupts conduction in tube 37 to produce a reversal of conductive conditions within circuit 6 lasting for a period of time determined primarily by the time constant circuit comprising resistance 38 and capacitance 39. Resumption of conduction by tube 37 results in the overall production of a positive pulse signal of relatively short duration at the anode of tube 37 which is substantially in time coincidence with the trailing edge of the positive pulse from the anode of tube 20. Capacitance 40 provides coupling between the triger circuits 5 and 6.

As thus far dscribed the circuit is capable only of producing a control pulse signal of selected duration having a constantly varying time displacement relative to the occurrence of the transmitter energy pulses. Additional circuit elements are provided so that this time displacement action will cease upon receipt of return energy from a reflecting object so that the control pulse signal will be produced substantially in time coincidence with the receipt of the echo energy. To this end, a coincidence tube 41 responsive to the control pulse signals and the received echo signals is biased to anode circuit non-conduction except during the period of simultaneous application to grids 42 and 43, respectively, of signals from the receiver 13 and the anode of tube 37. When the control signal from the anode of the tube 37 occurs in time coincidence with a received signal of sufficient amplitude, tube 41 is rendered conductive to produce a negative voltage pulse at the anode 44. This negative pulse is communicated through capacitance 45, diode electron tube 46 to capacitance 28 to effect a partial discharge thereof to oppose the voltage variation thereacross caused by the pulses from the anode of tube 20. Diode electron tube 48 is provided to "clamp" the cathode of tube 46 at a selected maximum positive voltage following each of the pulse signals from anode 44. The cathode biasing voltage of tube 48 is selected so that conduction by electon tube 46 during the pulses from anode of tube 20 is prevented. Therefore by suitable combination of capacitances 45, 28 and that between plates 27, 27–a, the voltage of grid 24 is varied in either direction so that the central portion of a received echo pulse will occur in coincidence with the trailing edge of the control pulse from the anode of tube 37. Subsequent motion of the reflecting object causing quicker return of echo energy will cause a larger portion of the received pulses to coincide with the control pulse signal to produce a reduction in voltage across capacitance 28 with subsequent shortening of the time displacement between the transmitter pulse and the control pulse.

Viewing of the time displacement of the control pulse signal is facilitated by connection of the output terminal 49 to the indicator 14.

Under certain circumstances it may be desirable to have the control signal produced in coincidence with an echo signal other than that from the nearest target or energy return object. The above system as described would invariably "lock" on the first echo signal of sufficient amplitude to operate the coincidence tube 41. The switch 47 is therefore included to prevent the application of signals from receiver 13 to coincidence tube grid 42 until the positive-varying control signal as viewed on the indicator 14 is in coincidence with the desired echo signal. The switch 47 is closed when coincidence between the desired signals is indicated and "lock" thereon is established.

With reference now to Fig. 2 a variant embodiment of the basic circuit of Fig. 1 is shown. The general operation of this circuit is similar to that of Fig. 1 differences being only in the circuits associated with the capacitance discharge tube 29 and the coincidence tube 41. In this circuit discharge tube 29 is of the gas filled type and is held normally in a non-conductive condition by virtue of a positive potential maintained at the cathode 31 thereof through potentiometer 32. Grid 30 is connected across capacitance 28 and as the potential thereacross increases due to progressive charging by trigger circuit 5 grid 30 is eventually raised to a potential permitting conduction of tube 29. Anode current flow through tube 29 then causes energization of relay 33 resulting in the making of contact between bars 34 and 35 and between bars 36 and 37. The making of contacts between bars 34 and 35 removes the anode supply from tube 29 by grounding one terminal of resistance 38 thus permitting the deionization of tube 29. The closure of contact between bars 36 and 37 grounds the grid 30 of tube 29 permitting a discharge of capacitance 28 as previously described.

The coincidence tube 41 is normally maintained in a cut-off condition by virtue of a negative potential applied to grid 42 and a low potential applied to grid 53. Grid 54 is normally at the cathode (or ground) potential. Anode current will flow in tube 41 only during the simultaneous occurrence of a received signal as applied to grid 42 and the positive pulse signal from anode 45 as applied to grid 53 through capacitance 46 and resistance 47. The flow of anode current in tube 41 is controlled in amplitude by a potential as applied to a third grid 54. This voltage may vary over the range from zero to a negative voltage sufficient to prevent anode current flow even under conditions of simultaneous application of signals to grid 42 and 53. It is obtained from anode 48 through an integrating network including capacitance 49 and resistance 50. Simultaneous with the production of a positive pulse at anode 45 a negative pulse is produced at anode 48 in conventional trigger circuit manner. Integration of the negative pulse from anode 48 produces a progressively decreasing voltage across capacitance 49 for the duration of the negative pulse at anode 48. In this manner the amplitude of the voltage excursion of anode 51 of tube 41 is controlled independently by the time occurrence of a received echo signal with respect to the pulse produced by trigger circuit 6.

From the foregoing discussion it is apparent that considerable modification of the features of the present invention is possible and while the device herein described and the form of apparatus for the operation thereof constitutes a preferred embodiment of the invention it is to be understood that the invention is not limited to this precise device and form of apparatus and that changes may be made therein without departing from the scope of the invention which is defined in the appended claims.

The invention described herein may be manufactured and used by or for the government of the United States of America for governmental purposes without the payment of any royalties thereon or therefor.

What is claimed is:

1. In combination, a recurrent pulse signal transmitter for producing electrical energy pulse signals, pulse signal receiver means for amplifying return energy signals, and identification pulse signal generator means, comprising; a first pulse signal generator producing a timing pulse signal subsequent to each electrical energy pulse signal generated by the transmitter, a second pulse signal generator responsive to the conclusion of the timing pulse signal from the first pulse signal generator to produce a control pulse signal of selected duration, coincidence means responsive to produce a gating signal upon simultaneous occurrence of the control pulse signal and a return energy signal, means progressively varying the duration of the timing pulse signals in one sense in response to successive timing pulse signals and in an inverse sense in response to successive gating pulse signals, means connected to said first pulse signal generator and responsive to said timing signal for periodically controlling the first pulse signal generator in the absence of said gating signal.

2. In combination, a recurrent pulse signal transmitter for producing electrical energy pulse signals, pulse signal receiver means for amplifying return energy signals, and identification pulse signal generator means, comprising; a first pulse signal generator producing a timing pulse signal of duration in dependency on a biasing voltage thereon subsequent to each electrical energy pulse signal generated by the transmitter, a second pulse signal generator responsive to the conclusion of the pulse signal from the first generator to produce a control pulse signal of selected duration, coincidence means responsive to produce a gating signal upon simultaneous occurrence of the control pulse signal and a return energy signal, a capacitive bias maintaining element connected to the first pulse signal generator to supply the biasing voltage thereto, a plurality of unilateral impedance elements connected to the first pulse signal generator and to the capacitive bias maintaining element for progressively varying the voltage across the bias maintaining element in one sense in response to successive timing pulse signals and in an inverse sense in response to successive gating pulse signals, and means periodically establishing a reference bias condition in absence of gating pulse signals.

3. A pulse echo signaling apparatus, comprising; electrical energy pulse signal transmitter means, radiator means, receiver means responsive to intercepted return pulse signals, and means producing a control signal in selected time relationship to selected return pulse signals, comprising; a first pulse signal generator for producing a timing pulse signal of duration in dependency on a biasing voltage thereon subsequent to each electrical energy pulse signal generated by the transmitter, a second pulse signal generator responsive to the conclusion of the timing pulse signal from the first generator to produce a control pulse signal of selected duration, coincidence means responsive to produce a gating signal upon simultaneous occurrence of the control pulse signal and a first return energy signal, a capacitive bias maintaining element connected to the first pulse signal generator to supply the biasing voltage thereto, a plurality of diode electron tubes connected to the first pulse signal generator and to the capacitive bias maintaining element for controllably applying the timing pulse signals and the gating signals to the bias maintaining element to vary the voltage thereacross in one sense in response to timing pulse signals and in an inverse sense in response to gating signals, means preventing the application of gating signals to the bias maintaining element when coincidence between the control pulse signals and a received return energy signal other than the first is desired, and means periodically establishing a reference voltage across the bias maintaining element in the absence of return energy signals.

4. In an electrical signaling system, means for transmitting recurrent pulse signals, a receiver for receiving echo signals, a first signal generator connected to said first mentioned means for providing a timing signal simultaneously with the occurrence of each of said recurrent pulse signals, said first signal generator including an electron tube having at least a cathode, an anode, and a control element, a second signal generator connected to said first signal generator and responsive to the termination of said timing signal for providing a control signal, coincidence means connected to said second signal generator and to said receiver for providing a gating signal upon the simultaneous application of said control signal and an echo signal to the coincidence means, an energy storing device, means for applying said timing signal and said gating signal to said energy storing device such that the magnitude of energy stored in said energy storing device is increased in dependency on said timing signal and decreased in dependency on said gating signal, and means for connecting said energy storing device to the control element of said electron tube.

5. In an electrical signaling system, means for transmitting recurrent pulse signals, a receiver for receiving echo signals, a first signal generator connected to said first mentioned means for providing a timing signal simultaneously with the occurrence of each of said recurrent pulse signals, said first signal generator including an electron tube having at least a cathode, an anode, and a control element, a second signal generator connected to said first signal generator and responsive to the termination of said timing signal for providing a control signal, coincidence means connected to said second signal generator and to said receiver for providing a gating signal upon the simultaneous application of said control signal and an echo signal to the coincidence means, an energy storing device, means for applying said timing signal and said gating signal to said energy storing device such that the magnitude of energy stored in said energy storing device is increased in dependency on said timing signal and decreased in dependency on said gating signal, means for connecting said energy storing device to the control element of said electron tube, and means connected to said first signal generator and responsive to said timing signal for periodically controlling the first signal generator in the absence of said gating signal.

References Cited in the file of this patent

UNITED STATES PATENTS

| | | |
|---|---|---|
| 2,494,339 | Keister | Jan. 10, 1950 |
| 2,495,753 | Mozley | Jan. 31, 1950 |
| 2,516,356 | Tull, et al. | July 25, 1950 |
| 2,538,027 | Mozley et al. | Jan. 16, 1951 |
| 2,737,652 | White | Mar. 6, 1956 |